Figure 1:
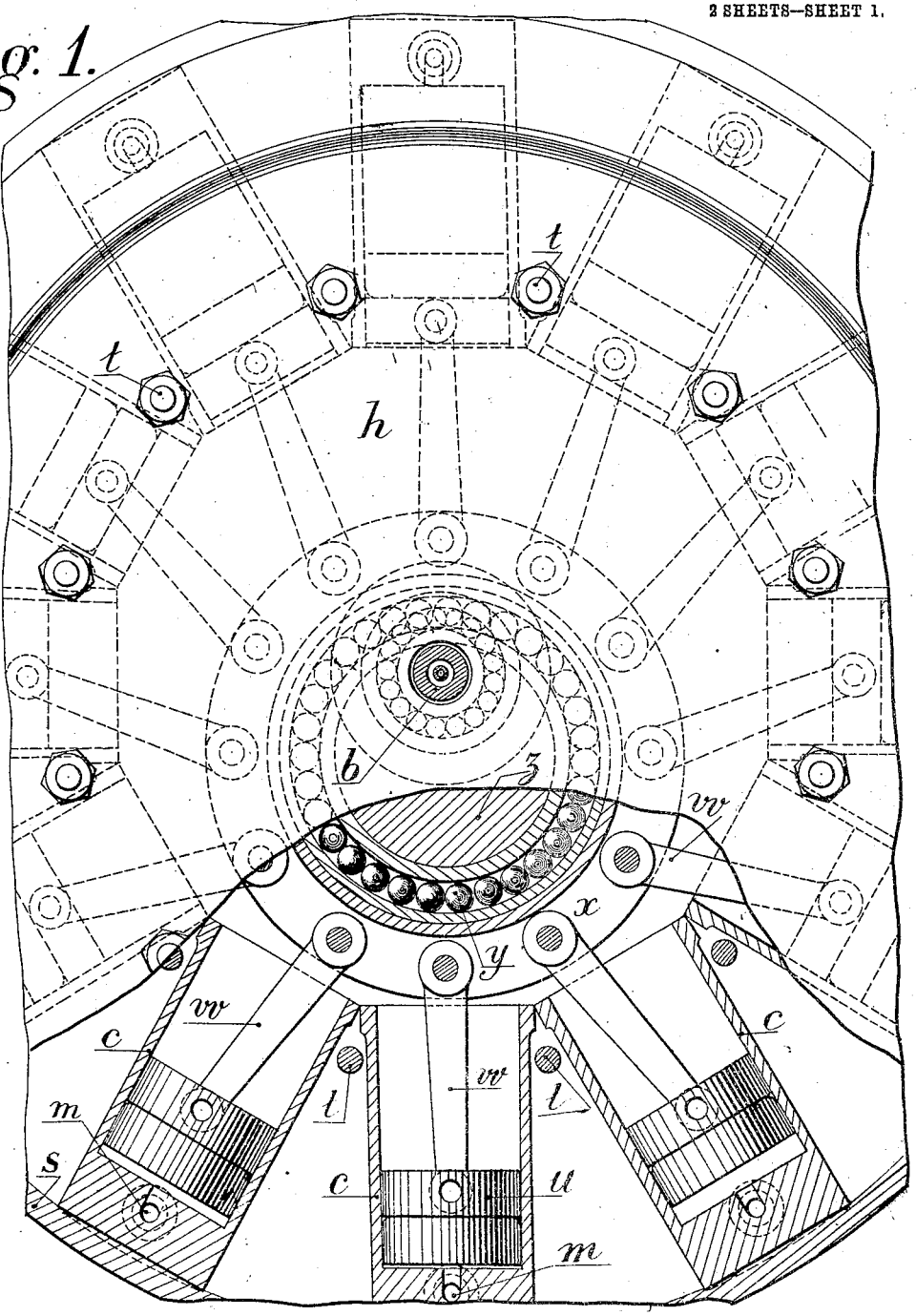

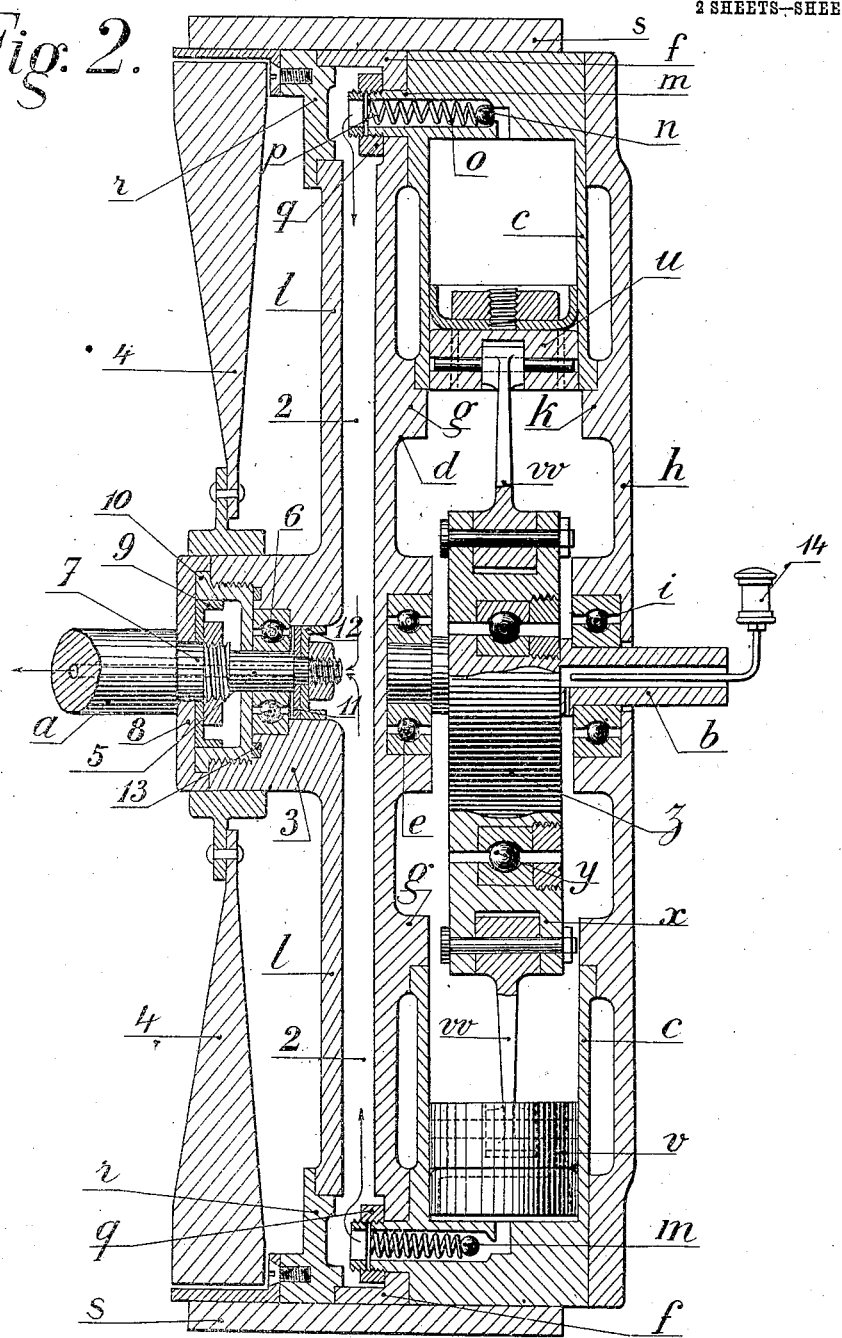

UNITED STATES PATENT OFFICE.

CHARLES LACOUR, OF LUNÉVILLE, FRANCE.

ROTARY REVERSIBLE PUMP.

955,464.

Specification of Letters Patent. Patented Apr. 19, 1910.

Application filed January 25, 1909. Serial No. 474,097.

*To all whom it may concern:*

Be it known that I, CHARLES LACOUR, a citizen of the French Republic, and resident of Lunéville, France, have invented certain new and useful Improvements in Rotary Reversible Pumps, of which the following is a specification.

The present invention relates to a rotary reversible pump which is particularly destined to serve as air-compressor or as motor operated by compressed air. This apparatus is characterized by a great number of small cylinders which are radially arranged in the same plane and whose pistons are connected with a cam the rotation of which determines a complete cycle of each piston at each revolution.

In the accompanying drawings the pump is shown by way of example.

Figure 1 is a side elevation of the pump, parts being represented in section; Fig. 2 is a cross section.

The apparatus is composed of two shafts $a$, $b$ fixed in alinement, the shaft $b$ serving as pivot for a hollow drum in which the cylinders $c$ are located, shaft $a$ being hollow and serving as axle for a disk which forms part of the revoluble drum.

The revoluble drum which carries the cylinders is constituted by the juxtaposition of three disks which are concentric with the shafts $a$ and $b$. The first disk $d$ is mounted upon the inner end of shaft $b$ running on balls $e$. The face of this disk which is turned toward shaft $a$ is preferably plane with the exception of a cylindrical flange $f$ at its periphery. A ringshaped projection $g$ upon the other surface of disk $d$ serves as bearing surface for one of the ends of cylinders $c$. Said disk $d$ is perforated by as many holes near its periphery as there are cylinders $c$ provided. The second disk $h$ is fixed upon the other end of shaft $b$ running on balls $i$ and having an inner ringshaped projection $k$ symmetrical to projection $g$ of disk $d$ and serving for the same purpose. The third disk $l$ is mounted upon the free end of shaft $a$; said third plate is of slightly smaller diameter than plates $d$, $h$ so that the openings in disk $d$ are not covered by it.

Each cylinder $c$ has a lateral tubular joint $m$ with threaded outer end, said joints communicating with the cylinders and having each a non-return valve which, for example, may consist of a ball $n$ pressed upon its seat by a spring $o$ whose end is maintained by a cross pin $p$. The different cylinders are put in place by inserting each tubular joint $m$ in one of the orifices of the disk $d$, the cylinders being then secured by means of a nut $q$. Hereafter a ring $r$ is fixed upon disk $l$ which thus becomes of equal diameter as plates $d$, $h$. The length of cylinders $c$ is such that the ends of the cylinders together with the rims of the several disks constitute a cylindrical rim similar to that of a pulley and upon which the belt $s$ is placed which operates the device.

Disks $d$ and $h$ are secured in position by means of cross bolts $t$ (Fig. 1) arranged between the cylinders.

The pistons $u$ which have air channels $v$ are connected by means of connecting rods $w$ with a crown $x$ mounted upon a cam $z$ keyed upon shaft $b$, said crown running on balls $y$.

If the drum $l$, $d$, $h$ be revolving under the influence of belt $s$ the different cylinders $c$ will revolve around cam $z$ and each piston $u$ will thus receive a to-and-fro motion. The outer air which penetrates between disks $d$ and $h$ through the spaces between the cylinders $c$ is drawn in through orifices $v$ and forced out by the pistons through the tubular joints $m$ into a collecting chamber 2 which is arranged between disks $d$ and $l$. From this chamber 2 the air under pressure escapes through the hollow shaft $a$. Upon hub 3 of disk $l$ blades 4 are fixed which revolve with the drum and produce a circulation of the air for cooling the parts of the device which get easily heated.

Disk $l$ is connected with shaft $a$ so that it can revolve around the same without therefore reducing the tight joint of air chamber 2 in the following manner:—hub 3 has a certain number of steps, shaft $a$ presenting a corresponding number of steps. The end of shaft $a$ which has the smallest diameter corresponds to the part of the hub which is of the smallest diameter, said part of the shaft being threaded. A ball bearing 6 upon which hub 3 runs is arranged at the middle part 5 of shaft $a$, part 7 of said shaft serving to receive an obturating device. First an obturating washer 8 is placed upon part 7 of shaft $a$, a leather disk 9 which is in contact with said washer serving to secure the tight joint in a hollow nut 10; hereupon the ball bearing 6 is put in place and a washer 11 is placed upon the part of the shaft which is of the smallest diameter, a leather disk 12 being connected with said washer, whereupon nut 10 is screwed into hub 3 which for this purpose is internally threaded and said nut is screwed up so that it forms tight joint by means of a leather washer 13. After having ascertained that the hub $e$ and its nut 10 can freely revolve around shaft $a$, and that a tight joint be formed between the shaft and the hub by the leather disk 12, leather washer 13 and leather disk 9, the putting together of the several parts is continued. Shaft $b$ is also hollow and its central channel is connected with a lubricator 14 from which a suitable lubricant is sent into the drum $d, h$, which thus is perfectly lubricated.

It is easy to make this apparatus reversible, that is to say, to use it as a motor. With this object in view, each cylinder may have a second tubular joint $m$ and a pointed rod which is normally held back by means of a spring so that it does not interfere with the working of valve $n$ when the apparatus be used as an air compressor. Said pointed pins are constructed so that they can be inserted in the tubular joints $m$ parallel with shafts $a, b$ to immobilize valves $n$ and to keep the same open. This movement could, for example, be obtained by means of a disk which is parallel with disk $h$ and adapted to be displaced upon shaft $b$ in any suitable manner. At the same time, two armed levers could be operated by said auxiliary disk if the same be moved toward the cylinders $c$, the other ends of the levers moving away from said cylinders effecting the opening of outlet orifices which in each cylinder are arranged so that they are passed unmasked by the pistons at the end of their strokes.

The hereinbefore described apparatus can be used as an air compressor and it is easy to obtain a considerable quantity of air at a pressure of 6 kilograms with cylinders of only 50 millimeters diameter, a dozen cylinders being combined in one apparatus. If such an apparatus be mounted in the flywheel of the motor for a motor car, and if shaft $a$ be made to terminate in the radiator the working of the pistons will insure a good refrigeration during the running of the car; when the car goes down hill one could conduct the air which escapes from shaft $a$ into a suitable reservoir, where thus a certain quantity of air be collected, the speed of the engine being simultaneously reduced; this spare-air could be utilized for starting the motor in using the reversible motion of the apparatus, or for inflating the air-tires.

I claim:—

An improved rotary reversible pump comprising in combination, a drum which forms a fly wheel, a great number of small cylinders radially disposed in said drum, a driving belt placed upon the rim of said drum, a crown in the drum with which the different pistons are hingedly connected, a cam in the drum surrounded by said crown, an axle of the drum consisting of two parts of which one is hollow, two disks mounted parallel but at a certain distance apart, the one from the other upon said hollow part of the axle so that they form an air chamber which is connected with the air cylinders, substantially as described and shown and for the purpose set forth.

In witness whereof I have hereunto set my hand in the presence of two witnesses.

CHARLES LACOUR.

Witnesses:
H. C. COXE,
ALFRED FREY.